(12) United States Patent
Gardner et al.

(10) Patent No.: US 9,116,056 B2
(45) Date of Patent: Aug. 25, 2015

(54) BUILDING BLOCK TRANSDUCER ASSEMBLY

(71) Applicant: Kulite SemiConductor Products, Inc., Leonia, NJ (US)

(72) Inventors: Robert Gardner, Westwood, NJ (US); Louis DeRosa, Wayne, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 284 days.

(21) Appl. No.: 13/775,340

(22) Filed: Feb. 25, 2013

(65) Prior Publication Data

US 2013/0220029 A1 Aug. 29, 2013

Related U.S. Application Data

(60) Provisional application No. 61/602,855, filed on Feb. 24, 2012.

(51) Int. Cl.
| | | |
|---|---|---|
| *G01L 7/00* | (2006.01) | |
| *G01L 1/00* | (2006.01) | |
| *G01L 15/00* | (2006.01) | |

(52) U.S. Cl.
CPC .. *G01L 1/00* (2013.01); *G01L 15/00* (2013.01)

(58) Field of Classification Search
CPC . G01L 19/0038; G01L 13/025; G01L 9/0054; G01L 19/0084; G01R 31/08
USPC ............... 73/700, 862.52, 721, 716, 727, 753
See application file for complete search history.

(56) References Cited

U.S. PATENT DOCUMENTS

| | | | |
|---|---|---|---|
| 2010/0089169 A1* | 4/2010 | Koehler et al. | 73/756 |
| 2010/0281994 A1* | 11/2010 | Brown et al. | 73/729.1 |
| 2011/0203381 A1* | 8/2011 | Kurtz et al. | 73/727 |

* cited by examiner

*Primary Examiner* — Lisa Caputo
*Assistant Examiner* — Nigel Plumb
(74) *Attorney, Agent, or Firm* — Troutman Sanders LLP; James E. Schutz; Mark Lehi Jones

(57) ABSTRACT

A transducer assembly configured to accommodate a plurality of individually tunable sensing elements of various geometries and configurations by using a cap and an accompanying capillary tube. The configuration of the various embodiments described herein eliminate the header to flat plate welds of the prior art, and therefore better accommodates a plurality of sensing elements and corresponding header assemblies within one transducer assembly.

20 Claims, 2 Drawing Sheets

BUILDING BLOCK TRANSDUCER ASSEMBLY

CROSS-REFERENCE TO RELATED APPLICATION

This application claims priority to U.S. Provisional Patent Application No. 61/602,855, filed Feb. 24, 2012, the contents of which are hereby incorporated by reference as if fully set forth below.

TECHNICAL FIELD

The present invention relates generally to transducer assemblies that accommodate a plurality of individually tunable sensors of different configurations and geometries.

BACKGROUND

Pressure transducer assemblies may comprise a plurality of sensing elements and respective sensor headers. One problem associated with pressure transducer assemblies of the prior art, however, is the inability to weld multiple sensor headers onto a flat plate within the pressure transducer assembly. Welding a plurality of sensor headers onto a flat plate is difficult because the welds are typically made perpendicular to the header diameter, which causes the weld of each header to interfere with adjacent headers. Additionally, perpendicular welds are difficult to achieve because of tolerancing and fixturing issues.

It is therefore desirable to create a pressure transducer assembly that removes the weld requirement of the prior art, yet still allows for multiple, tunable pressure sensors to be incorporated into one pressure transducer assembly. It is to this need that the present invention is directed.

BRIEF SUMMARY

Example embodiments of the present invention provide a tunable transducer assembly, comprising: a first sensing element; a first cap surrounding at least of portion of the first sensing element such that a first cavity is defined between the first cap and the first sensing element; and a first capillary tube having a first end and a second end, wherein the first end receives a first incoming condition stream and the second end is attached to the first cap; wherein the first capillary tube channels the first incoming condition stream from the first end to the second end of the first capillary tube and into the first cavity to be subsequently measured by the first sensing element.

Other example embodiments of the present invention provide a tunable transducer assembly, comprising: a main connector housing defining a first port, the first port being adapted to receive a first incoming condition stream; a first capillary tube having a first end and a second end, wherein the first end of the first capillary tube is in communication with the first port and receives the first incoming condition stream; and a first cap in communication with the second end of the first capillary tube, wherein the first cap surrounds a first sensing element such that a first cavity is defined between the first cap and the first sensing element; wherein the first capillary tube channels the first incoming condition stream from the first end to the second end and into the first cavity to be subsequently measured by the first sensing element.

Other example embodiments of the present invention provide a method for tuning a transducer assembly, comprising: determining a first cavity volume based on a first tuning parameter for a first sensing element, wherein the first cavity volume surrounds the first sensing element; adjusting a first cap surrounding at least a portion of the first sensing element to define the first cavity volume; and determining a first distance between a first end and a second end of a first capillary tube based on the first tuning parameter; wherein the first end of the first capillary tube receives a first incoming stream and the second end of the first capillary tube is attached to the first cap, and wherein the first capillary tube channels the first incoming condition stream into the first cavity volume to be subsequently measured by the first sensing element.

DETAILED DESCRIPTION

Figure 1:
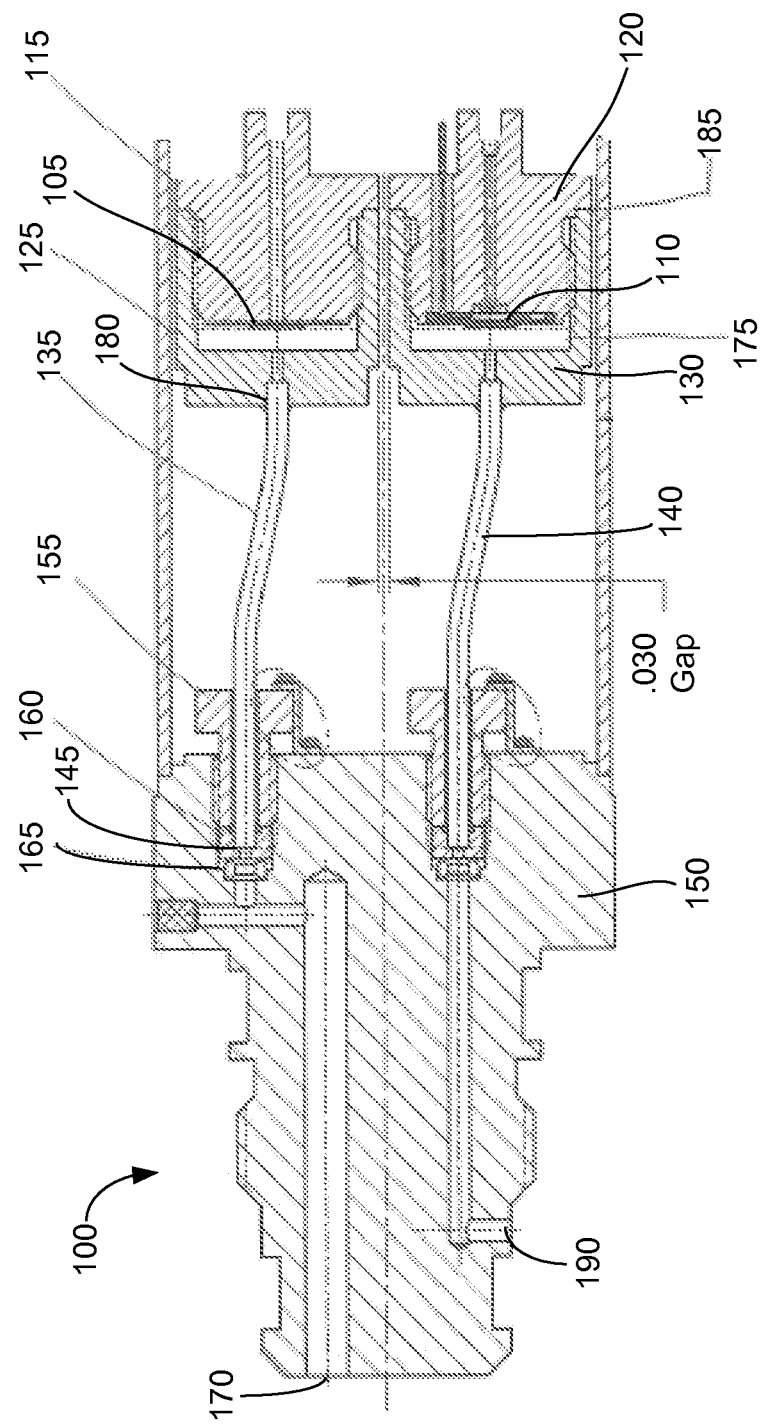
FIG. 1 illustrates a transducer assembly comprising a plurality of tunable sensing elements in accordance with embodiments of the present invention.

Although many embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an," and "the" include plural referents unless the context clearly dictates otherwise.

Also, in describing the many embodiments, terminology will be resorted to for the sake of clarity. It is intended that each term contemplates its broadest meaning as understood by those skilled in the art and includes all technical equivalents which operate in a similar manner to accomplish a similar purpose.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical pressure sensor assemblies and chip-package assemblies and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Embodiments of the present invention provide a transducer assembly configured to accommodate a plurality of individually tunable sensing elements of various geometries and configurations by using a cap and an accompanying capillary tube. The configuration of the various embodiments described herein eliminate the header to flat plate welds of the prior art, and thus better accommodates a plurality of sensing elements and corresponding header assemblies within one transducer assembly.

Referring to FIG. 1, there is shown a transducer assembly 100 in accordance with the present invention. As illustrated, a first sensing element 105 and a second sensing element 110 may be housed within the transducer assembly 100. As further illustrated, the first and second sensing elements 105/110 may be mounted onto first and second header assemblies 115/120, respectively. It shall be understood that while only two sensing elements are illustrated in the figure, the transducer assembly 100 may accommodate a plurality of sensing elements and is by no means limited to two sensing elements.

It shall be understood that the sensing elements may be configured to sense and measure an applied condition from an incoming condition stream, for example but not limited to, temperature and/or pressure. It shall be further understood that each sensing element within the transducer assembly may be configured to measure a different condition, or alternatively, measure the same condition under different ranges. For example, a first sensing element may measure pressure and a second sensing element may measure temperature. As another example, a first sensing element may measure pressure having a first range and a second sensing element may measure pressure having a second range. Once the sensing element measures an applied condition, it outputs a signal indicative of the applied condition to an external device.

As illustrated, there is a first port 170 and a second port 190 defined within a main connector housing 150. The main connector housing 150 may be configured to screw or otherwise connect the entire transducer assembly 100 into a component to be measured, for example, a gas turbine engine. The first port 170 and second port 190 are configured to receive a first and second incoming condition stream, respectively. The incoming condition may be, for example but not limited to, temperature or pressure. The first port 170 corresponds to the first sensing element 105 and the second port 190 corresponds to the second sensing element 110. The first port 170 and second port 190 are defined within a main connector housing 150.

To enable the transducer assembly 100 to accommodate a plurality of sensing elements, the sensing elements and associated headers are set back from the first port 170 and second port 190. A capillary tube and cap assembly are disposed therebetween to facilitate the transport of the incoming condition stream from the first port 170 and second port 190 to the first sensing element 105 and second sensing element 110, respectively.

A first capillary tube 135 and a first cap 125 correspond to the first sensing element 105 and a second capillary tube 140 and a first cap 130 correspond to the second sensing element 110. It shall be understood that the following description describes a single capillary tube and cap, however, the description is applicable for each of the plurality of capillary tubes and caps within the transducer assembly 100.

As illustrated in FIG. 1, the first capillary tube 135 comprises a first end 145 and a second end 180. The first end 145 of the first capillary tube 135 is fit within the body of the main connector housing 150. In an example embodiment, the first end 145 of the first capillary tube 135 may be securely fastened within the main connector housing 150 via a suitable connection mechanism, such as a locking nut 155, wherein the locking nut may be threaded into an opening defined in the body of the main connector housing 150. Further, a ferrule 160 may also be attached to the first end 145 of the first capillary tube 135 to strengthen the first end 145 of the first capillary tube 135 and to prevent the first end 145 from splitting or wearing as it is threaded via the locking nut 155 into the main connector 150 and during normal operation. In another example embodiment, a crush ring 165 may be disposed within the opening defined in the main connector housing 150, such that when the first end 145 of the first capillary tube 135 is threaded via the locking nut 155 into the main connector housing 150, the crush ring 165 can strengthen the seal between the ferrule 160 and the main connector housing 150.

The second end 180 of the first capillary tube 135 is attached to the first cap 125. The first cap 125 is adapted to surround the first sensing element 105 and attach to the first header 115 via a header-cap weld 185. The first cap 125 defines an aperture to accommodate the second end 180 of the first capillary tube 135, therefore enabling the first capillary tube 135 to funnel the first incoming condition stream to the first sensing element 105. The first cap 125 surrounds the first sensing element 105 such that a first cavity having a first volume is defined around the first sensing element 105. Manipulation of the first volume enables the individual tuning of the first sensing element 105, which will be further described below. It shall be understood that the first capillary tube and the first cap may be applied to each respective sensing element within the transducer assembly, and is by no means limited only to the first sensing element.

Figure 2:
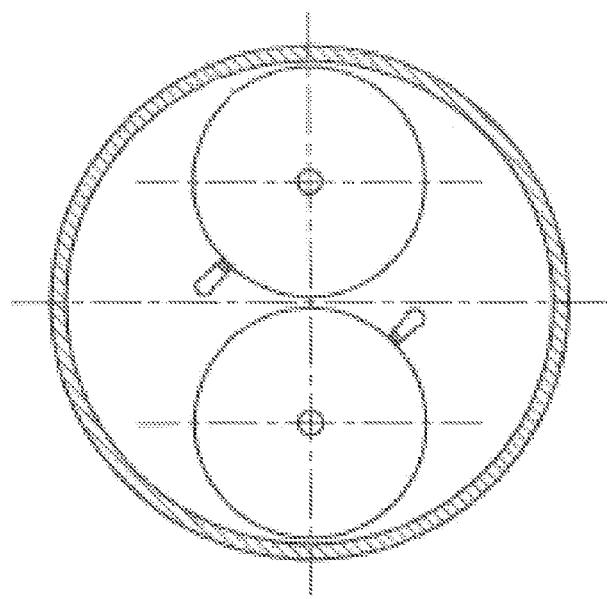
FIG. 2 illustrates a cross-sectional view of the sensing elements illustrated in FIG. 1.

As previously described, a first and second incoming condition stream are applied to first and second pressure ports 170/190, respectively, defined within the body of the main connector housing 150. The first and second incoming condition streams are then routed via the first and second pressure ports 170/190 to the first and second capillary tubes 135/140, respectively, which subsequently funnels the first and second incoming condition streams to the first and second sensing elements 105/110, respectively. The first and second sensing elements 105/110 then output signals indicative of the sensed condition from the first and second incoming condition streams. It shall be understood that the first and second sensing elements 105/110 may be substantially identical in configuration or vastly different. In an example embodiment, both the first and second sensing elements 105/110 may be absolute pressure sensors or differential pressure sensors. In another example embodiment, the first sensing element 105 may be an absolute pressure sensor and the second sensing element 110 may be a differential pressure sensor. In yet another example embodiment, the first sensing element 105 may be a pressure sensor and the second sensing element 110 may be a temperature sensor. Thus, the transducer assembly 100 of the present invention enables multiple sensing elements to be configured within the transducer assembly, and further enables sensing elements of different types and configurations to be configured within the transducer assembly. Referring to FIG. 2, there is shown a cross-sectional view of the first and second sensing elements 105/110. It shall also be understood that while the examples described herein comprise a first sensing element and a second sensing element, additional or fewer sensing elements may be incorporated with the transducer assembly.

An additional advantage of the transducer assembly 100 of the present invention is that each sensing element may be individually tuned for frequency response and/or pressure spike damping. The sensing elements may be tuned by varying the length of the capillary tube and varying the cavity volume 175 between the sensing element and the cap. Such tuning varies the frequency response and damping effect of the transducer assembly 100. One skilled in the art will appreciate that the longer in length the capillary tube, the greater the damping effect. Similarly, the larger the cap volume, the greater the damping effect. It shall further be understood that each sensing element may be tuned to substantially similar frequency and/or damping parameters or completely different frequency and/or damping parameters.

While the transducer assembly 100 of the present invention accommodates a plurality of independent and individually tunable sensing elements, it shall also be understood that the transducer assembly 100 may accommodate sensing elements of various geometries. In an exemplary embodiment, the sensing element may comprise a simple plate having surface seals and a plurality of port orifices leading to the capillary tube. In another exemplary embodiment, the sensing element may be a standard plate comprising a piezoresistive Wheatstone bridge.

The transducer assembly 100 of the present invention allows for tremendous flexibility in the orientation of sensing elements and individual sensing element tuning.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A transducer assembly, comprising:
a first sensing element;
a first cap surrounding at least of portion of the first sensing element such that a first cavity is defined between the first cap and the first sensing element; and
a first capillary tube having a first end and a second end, wherein the first end receives a first incoming condition stream and the second end is attached to the first cap;
wherein the first capillary tube channels the first incoming condition stream from the first end to the second end of the first capillary tube and into the first cavity to be subsequently measured by the first sensing element.

2. The transducer assembly of claim 1, wherein the length between the first end and the second end of the first capillary tube is predetermined based on tuning parameters for the first sensing element.

3. The transducer assembly of claim 1, wherein the first cavity has a predetermined volume based on tuning parameters for the first sensing element.

4. The transducer assembly of claim 1, further comprising:
a second sensing element;
a second cap surrounding at least of portion of the second sensing element such that a second cavity is defined between the second cap and the second sensing element; and
a second capillary tube having a first end and a second end, wherein the first end of the second capillary tube receives a second incoming condition stream and the second end of the second capillary tube is attached to the second cap;
wherein the second capillary tube channels the second incoming condition stream from the first end to the second end of the second capillary tube and into the second cavity to be subsequently measured by the second sensing element.

5. The transducer assembly of claim 4, wherein the first sensing element and the second sensing element are substantially identical in configuration.

6. The transducer assembly of claim 4, wherein the first sensing element and the second sensing element are of different configurations.

7. The transducer assembly of claim 4, wherein the first sensing element and second sensing element are pressure sensing elements.

8. The transducer assembly of claim 4, wherein the first sensing element is a pressure sensing element and the second sensing element is a temperature sensing element.

9. A transducer assembly, comprising:
a main connector housing defining a first port, the first port being adapted to receive a first incoming condition stream;
a first capillary tube having a first end and a second end, wherein the first end of the first capillary tube is in communication with the first port and receives the first incoming condition stream; and
a first cap in communication with the second end of the first capillary tube, wherein the first cap surrounds a first sensing element such that a first cavity is defined between the first cap and the first sensing element;
wherein the first capillary tube channels the first incoming condition stream from the first end to the second end and into the first cavity to be subsequently measured by the first sensing element.

10. The transducer assembly of claim 9, wherein the length between the first end and the second end of the first capillary tube is predetermined based on tuning parameters for the first sensing element.

11. The transducer assembly of claim 9, wherein the first cavity has a predetermined volume based on tuning parameters for the first sensing element.

12. A transducer assembly of claim 9, further comprising:
a second port defined within the main connector housing, the second port being adapted to receive a second incoming condition stream;
a second capillary tube having a first end and a second end, wherein the first end of the second capillary tube is in communication with the second port and receives the second incoming condition stream; and
a second cap in communication with the second end of the second capillary tube, wherein the second cap surrounds a second sensing element such that a second cavity is defined between the second cap and the second sensing element;
wherein the second capillary tube channels the second incoming condition stream from the first end to the second end of the second capillary tube and into the second cavity to be subsequently measured by the second sensing element.

13. The transducer assembly of claim 12, wherein the first sensing element and the second sensing element are substantially identical in configuration.

14. The transducer assembly of claim 12, wherein the first sensing element and the second sensing element are of different configurations.

15. The transducer assembly of claim 12, wherein the first sensing element and second sensing element are pressure sensing elements.

16. The transducer assembly of claim 12, wherein the first sensing element is a pressure sensing element and the second sensing element is a temperature sensing element.

17. A method of tuning a transducer assembly, comprising:
    determining a first cavity volume based on a first tuning parameter for a first sensing element, wherein the first cavity volume surrounds the first sensing element;
    adjusting a first cap surrounding at least a portion of the first sensing element to define the first cavity volume; and
    determining a first distance between a first end and a second end of a first capillary tube based on the first tuning parameter;
    wherein the first end of the first capillary tube receives a first incoming stream and the second end of the first capillary tube is attached to the first cap, and wherein the first capillary tube channels the first incoming condition stream into the first cavity volume to be subsequently measured by the first sensing element.

18. The method of claim 17, further comprising:
    determining a second cavity volume based on a second tuning parameter for a second sensing element, wherein the second cavity volume surrounds the second sensing element;
    adjusting a second cap surrounding at least a portion of the second sensing element to define the second cavity volume; and
    determining a second distance between a first end and a second end of a second capillary tube based on the second tuning parameter;
    wherein the first end of the second capillary tube receives a second incoming stream and the second end of the second capillary tube is attached to the second cap, and wherein the second capillary tube channels the second incoming condition 19. The method of claim 17, wherein the first tuning parameter and the second tuning parameter are about the same.

20. The method of claim 17, wherein the first tuning parameter and the second tuning parameter are different.

* * * * *